United States Patent
Lautenbach et al.

(10) Patent No.: US 10,003,738 B2
(45) Date of Patent: Jun. 19, 2018

(54) METHODS AND APPARATUS FOR DETECTING AND/OR INDICATING A BLOCKED SENSOR OR CAMERA MODULE

(71) Applicant: Light Labs Inc., Palo Alto, CA (US)

(72) Inventors: Bradley Lautenbach, San Fransisco, CA (US); Rajiv Laroia, Far Hills, NJ (US)

(73) Assignee: Light Labs Inc., Palo Alto, CA (US)

( * ) Notice: Subject to any disclaimer, the term of this patent is extended or adjusted under 35 U.S.C. 154(b) by 0 days. days.

(21) Appl. No.: 15/297,129

(22) Filed: Oct. 18, 2016

(65) Prior Publication Data

US 2017/0180637 A1 Jun. 22, 2017

Related U.S. Application Data

(63) Continuation-in-part of application No. 14/976,765, filed on Dec. 21, 2015.
(Continued)

(51) Int. Cl.
*H04N 5/232* (2006.01)
*G08B 6/00* (2006.01)

(52) U.S. Cl.
CPC .......... *H04N 5/23222* (2013.01); *G08B 6/00* (2013.01); *H04N 5/23293* (2013.01)

(58) Field of Classification Search
CPC .............. H04N 5/2256; H04N 5/2257; H04N 5/23293; H04N 5/23222; F21V 33/0052; F21V 23/003; F21Y 2115/10
See application file for complete search history.

(56) References Cited

U.S. PATENT DOCUMENTS

| | | |
|---|---|---|
| 4,427,888 A | 1/1984 | Galvin |
| 4,544,241 A | 10/1985 | LaBudde et al. |
| | (Continued) | |

FOREIGN PATENT DOCUMENTS

| | | |
|---|---|---|
| EP | 2642757 A2 | 9/2013 |
| JP | 10091765 | 4/1998 |
| | (Continued) | |

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Hung Lam
(74) *Attorney, Agent, or Firm* — Straub & Straub; Michael P. Straub; Stephen T. Straub

(57) ABSTRACT

Methods and apparatus for detecting and/or indicating a blocked sensor and/or blocked camera module are described. The sensor maybe a distance sensor used to support focus operations. Depending on the embodiment, the camera system may include one or more sensors and one or more camera modules. As sensor output is received and/or images are captured by one or more camera modules, the sensor output, e.g., distance sensor output, and/or captured images, e.g., optical image sensor output, are checked to determine if one or more of the sensors and/or camera modules are obstructed. When an obstruction of a sensor or camera module is detected, to make a user aware of the obstruction condition a visual and/or physical indication of an obstructed sensor or camera module is provided to the user of the camera device. The indication may include haptic feedback in the form of vibrations and/or a visual obstruction indication.

18 Claims, 9 Drawing Sheets

Related U.S. Application Data

(60) Provisional application No. 62/269,732, filed on Dec. 18, 2015.

(56) References Cited

U.S. PATENT DOCUMENTS

| | | | |
|---|---|---|---|
| 4,890,133 | A | 12/1989 | Ogawa et al. |
| 5,078,479 | A | 1/1992 | Vuilleumier |
| 5,153,569 | A | 10/1992 | Kawamura et al. |
| 5,353,068 | A | 10/1994 | Moriwake |
| 5,583,602 | A | 12/1996 | Yamamoto |
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |
| 6,011,661 | A | 1/2000 | Weng |
| 6,028,600 | A | 2/2000 | Rosin et al. |
| 6,081,670 | A | 6/2000 | Madsen et al. |
| 6,141,034 | A | 10/2000 | McCutchen |
| 6,201,899 | B1 | 3/2001 | Bergen |
| 6,255,651 | B1 * | 7/2001 | Laluvein ............... G08B 17/12 250/339.15 |
| 7,009,652 | B1 | 3/2006 | Tanida et al. |
| 7,280,735 | B2 | 10/2007 | Thibault |
| 7,315,423 | B2 | 1/2008 | Sato |
| 7,551,358 | B2 | 6/2009 | Lee et al. |
| 7,561,201 | B2 | 7/2009 | Hong |
| 7,801,428 | B2 | 9/2010 | Nagaishi et al. |
| 7,810,511 | B2 | 10/2010 | Fagrenius et al. |
| 8,144,230 | B2 | 3/2012 | Watanabe et al. |
| 8,194,169 | B2 | 6/2012 | Tamaki et al. |
| 8,199,222 | B2 | 6/2012 | Drimbarean et al. |
| 8,237,841 | B2 | 8/2012 | Tanida et al. |
| 8,320,051 | B2 | 11/2012 | Matsumura et al. |
| 8,417,058 | B2 | 4/2013 | Tardif |
| 8,482,637 | B2 | 7/2013 | Ohara et al. |
| 8,520,022 | B1 | 8/2013 | Cohen et al. |
| 8,553,106 | B2 | 10/2013 | Scarff |
| 8,619,082 | B1 | 12/2013 | Ciurea et al. |
| 8,639,296 | B2 | 1/2014 | Anh et al. |
| 8,665,341 | B2 | 3/2014 | Georgiev et al. |
| 8,704,944 | B1 | 4/2014 | Wierzoch et al. |
| 8,762,895 | B2 | 6/2014 | Mehta et al. |
| 8,780,258 | B2 | 7/2014 | Lee |
| 8,896,655 | B2 | 11/2014 | Mauchly et al. |
| 8,970,765 | B2 | 3/2015 | Higashimoto |
| 9,041,826 | B2 | 5/2015 | Jung et al. |
| 9,104,705 | B2 | 8/2015 | Fujinaga |
| 9,135,732 | B2 | 9/2015 | Winn et al. |
| 9,197,816 | B2 | 11/2015 | Laroia |
| 9,270,876 | B2 | 2/2016 | Laroia |
| 9,282,228 | B2 | 3/2016 | Laroia |
| 9,325,906 | B2 | 4/2016 | Laroia |
| 9,374,514 | B2 | 6/2016 | Laroia |
| 9,423,588 | B2 | 8/2016 | Laroia |
| 9,426,365 | B2 | 8/2016 | Laroia et al. |
| 9,451,171 | B2 | 9/2016 | Laroia |
| 9,462,170 | B2 | 10/2016 | Laroia et al. |
| 9,467,627 | B2 | 10/2016 | Laroia |
| 9,544,501 | B2 | 1/2017 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,568,713 | B2 | 2/2017 | Laroia |
| 9,578,252 | B2 | 2/2017 | Laroia |
| 9,671,595 | B2 | 6/2017 | Laroia |
| 9,686,471 | B2 | 6/2017 | Laroia et al. |
| 9,690,079 | B2 | 6/2017 | Laroia |
| 9,736,365 | B2 | 8/2017 | Laroia |
| 9,749,511 | B2 | 8/2017 | Laroia |
| 9,749,549 | B2 | 8/2017 | Shroff |
| D802,646 | S | 11/2017 | Laroia et al. |
| 9,824,427 | B2 | 11/2017 | Pulli et al. |
| 2002/0149691 | A1 | 10/2002 | Pereira et al. |
| 2003/0018427 | A1 | 1/2003 | Yokota et al. |
| 2003/0020814 | A1 | 1/2003 | Ono |
| 2003/0185551 | A1 | 10/2003 | Chen |
| 2004/0027695 | A1 | 2/2004 | Lin |
| 2004/0100479 | A1 | 5/2004 | Nakano et al. |
| 2004/0227839 | A1 | 11/2004 | Stavely et al. |
| 2005/0088546 | A1 | 4/2005 | Wang |
| 2005/0200012 | A1 | 9/2005 | Kinsman |
| 2006/0067672 | A1 | 3/2006 | Washisu et al. |
| 2006/0187311 | A1 | 8/2006 | Labaziewicz et al. |
| 2006/0187338 | A1 | 8/2006 | May et al. |
| 2006/0221218 | A1 | 10/2006 | Alder et al. |
| 2006/0238886 | A1 | 10/2006 | Kushida et al. |
| 2006/0281453 | A1 | 12/2006 | Jaiswel et al. |
| 2007/0050139 | A1 | 3/2007 | Sidman |
| 2007/0065012 | A1 | 3/2007 | Yamakado et al. |
| 2007/0127915 | A1 | 6/2007 | Lu et al. |
| 2007/0177047 | A1 | 8/2007 | Goto |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0084484 | A1 | 4/2008 | Ochi et al. |
| 2008/0111881 | A1 | 5/2008 | Gibbs et al. |
| 2008/0180562 | A1 | 7/2008 | Kobayashi |
| 2008/0211941 | A1 | 9/2008 | Deever et al. |
| 2008/0219654 | A1 | 9/2008 | Border et al. |
| 2008/0240698 | A1 | 10/2008 | Bartilson et al. |
| 2008/0247745 | A1 | 10/2008 | Nilsson |
| 2008/0251697 | A1 | 10/2008 | Park et al. |
| 2008/0278610 | A1 | 11/2008 | Boettiger |
| 2009/0059037 | A1 | 3/2009 | Naick et al. |
| 2009/0086032 | A1 | 4/2009 | Li |
| 2009/0136223 | A1 | 5/2009 | Motomura et al. |
| 2009/0154821 | A1 | 6/2009 | Sorek et al. |
| 2009/0225203 | A1 | 9/2009 | Tanida et al. |
| 2009/0278950 | A1 | 11/2009 | Deng et al. |
| 2009/0290042 | A1 | 11/2009 | Shiohara |
| 2010/0013906 | A1 | 1/2010 | Border et al. |
| 2010/0034531 | A1 | 2/2010 | Go |
| 2010/0045774 | A1 | 2/2010 | Len et al. |
| 2010/0053414 | A1 | 3/2010 | Tamaki et al. |
| 2010/0079635 | A1 | 4/2010 | Yano et al. |
| 2010/0091089 | A1 | 4/2010 | Cromwell et al. |
| 2010/0097443 | A1 | 4/2010 | Lablans |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0296802 | A1 | 11/2010 | Davies |
| 2011/0051243 | A1 | 3/2011 | Su |
| 2011/0063325 | A1 | 3/2011 | Saunders |
| 2011/0069189 | A1 | 3/2011 | Venkataraman et al. |
| 2011/0080655 | A1 | 4/2011 | Mori |
| 2011/0123115 | A1 | 5/2011 | Lee et al. |
| 2011/0128393 | A1 | 6/2011 | Tavi et al. |
| 2011/0157430 | A1 | 6/2011 | Hosoya et al. |
| 2011/0157451 | A1 | 6/2011 | Chang |
| 2011/0187878 | A1 | 8/2011 | Mor et al. |
| 2011/0188744 | A1 | 8/2011 | Sun |
| 2011/0193984 | A1 | 8/2011 | Kitaya et al. |
| 2011/0221920 | A1 | 9/2011 | Gwak |
| 2011/0222167 | A1 | 9/2011 | Iwasawa |
| 2011/0242342 | A1 | 10/2011 | Goma et al. |
| 2011/0280565 | A1 | 11/2011 | Chapman et al. |
| 2011/0285895 | A1 | 11/2011 | Weng et al. |
| 2012/0002096 | A1 | 1/2012 | Choi et al. |
| 2012/0013708 | A1 | 1/2012 | Okubo |
| 2012/0027462 | A1 | 2/2012 | Nozawa |
| 2012/0033069 | A1 | 2/2012 | Becker et al. |
| 2012/0062691 | A1 | 3/2012 | Fowler et al. |
| 2012/0082368 | A1 | 4/2012 | Hirai et al. |
| 2012/0155848 | A1 | 6/2012 | Labowicz et al. |
| 2012/0162464 | A1 | 6/2012 | Kim |
| 2012/0188391 | A1 | 7/2012 | Smith |
| 2012/0212651 | A1 | 8/2012 | Sawada |
| 2012/0242881 | A1 | 9/2012 | Suzuki |

(56) References Cited

U.S. PATENT DOCUMENTS

| | | |
|---|---|---|
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0020470 A1 | 1/2013 | Luo et al. |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sarce et al. |
| 2013/0169934 A1 | 7/2013 | Verdooner |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2013/0300860 A1 | 11/2013 | Komatsu |
| 2013/0300869 A1 | 11/2013 | Lu et al. |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1 | 8/2014 | Park et al. |
| 2014/0267243 A1 | 9/2014 | Venkataraman et al. |
| 2014/0267844 A1 | 9/2014 | Iwata et al. |
| 2014/0293079 A1* | 10/2014 | Milanfar ............ H04N 5/2171 348/222.1 |
| 2014/0340569 A1 | 11/2014 | Raskar et al. |
| 2014/0354714 A1 | 12/2014 | Hirschler et al. |
| 2015/0029595 A1 | 1/2015 | Swihart et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0163400 A1* | 6/2015 | Geiss ............ H04N 5/23229 348/231.99 |
| 2015/0234149 A1 | 8/2015 | Kreitzer et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0253647 A1 | 9/2015 | Mercado |
| 2015/0279012 A1 | 10/2015 | Brown et al. |
| 2015/0296149 A1 | 10/2015 | Laroia |
| 2016/0004144 A1* | 1/2016 | Laroia ............ G03B 17/18 348/222.1 |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0142610 A1 | 5/2016 | Rivard et al. |
| 2016/0165101 A1* | 6/2016 | Akiyama ............ H04N 5/23229 348/187 |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010114760 A | 5/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |
| WO | 2009145401 A1 | 12/2009 |
| WO | 2012089895 A1 | 7/2012 |

OTHER PUBLICATIONS

Robertson, M et al "Dynamic Range Improvement Through Multiple Exposures". 1999. [online] [retrieved on Apr. 16, 2014]: <URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

* cited by examiner

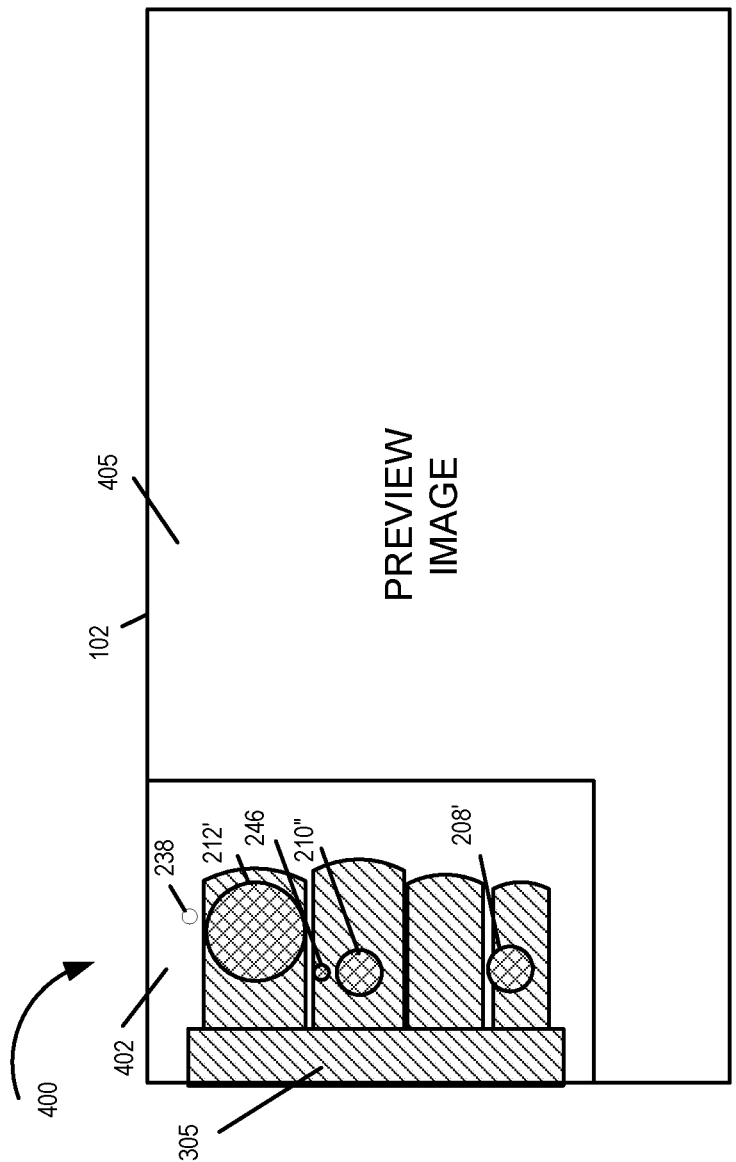

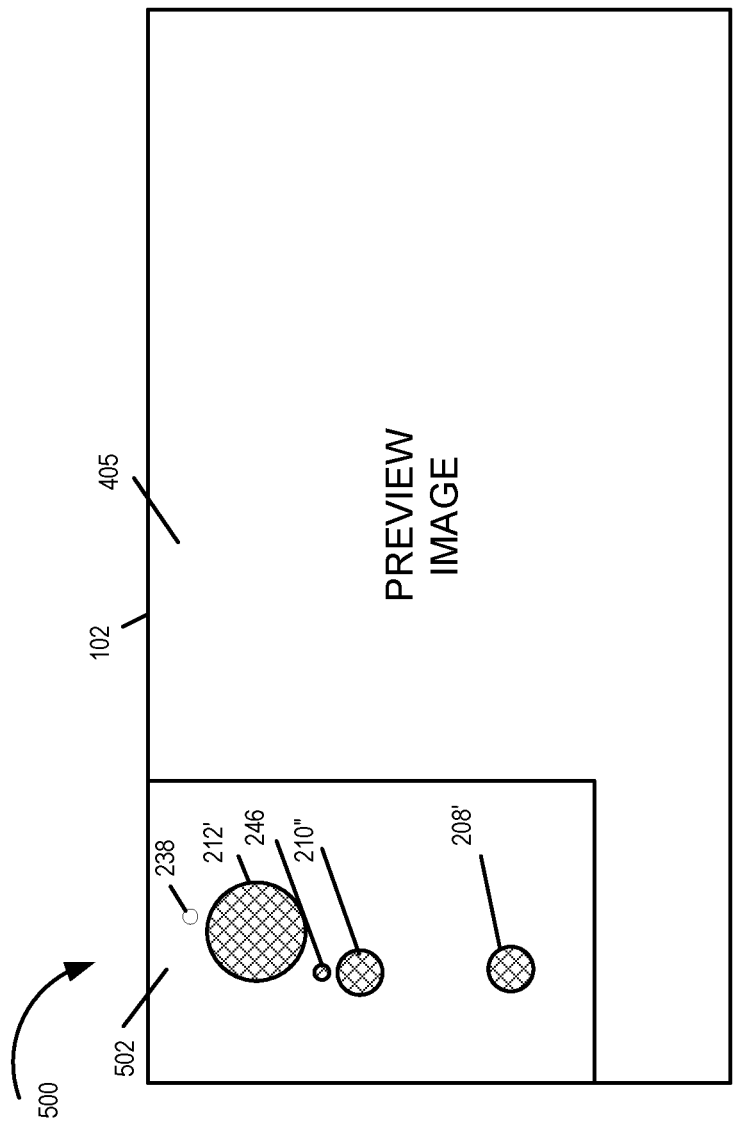

METHODS AND APPARATUS FOR DETECTING AND/OR INDICATING A BLOCKED SENSOR OR CAMERA MODULE

RELATED APPLICATIONS

The present application claims the benefit of U.S. Provisional Application Ser. No. 62/269,732 filed Dec. 18, 2015 and is a continuation in part of U.S. patent application Ser. No. 14/976,765 filed Dec. 21, 2015 both of which are hereby expressly incorporated by reference in their entirety.

FIELD

The present application relates to camera device methods and apparatus and, more particularly, to methods and apparatus for detecting and/or indicating a blocked, e.g., obstructed, sensor and/or blocked camera module.

BACKGROUND

Cameras often include an optical chain used to capture an image and one or more sensors, e.g., distance sensors, used for focus control. Each optical chain normally includes at least one lens and an image sensor. Some camera systems include multiple optical chains, e.g. camera modules. Such devices have advantages over single lens systems in size and weight for at least some applications.

Cameras with multiple optical chains often include multiple openings, e.g., one per optical chain, through which light can enter the optical chain before being captured by the corresponding sensor of the optical chain. A protective plate of glass or a lens may cover the opening to protect the components of the optical chain from foreign objects. Thus, in a handheld camera including multiple optical chains, there may be, and often are, multiple optical chain openings on the face of the camera.

In some systems, the openings and/or sensors may be, and sometimes are, covered by a plate of glass. With a camera device including multiple optical chains and sensors, it is relatively easy for a user to unintentionally cover one or more of the sensors and/or optical chains with a finger or other portion of their hand when holding the camera device. Other types of obstructions of sensors and/or camera modules are also possible.

The user may not notice the problem with the way they are holding the camera, particularly if the face of the camera is smooth as may be the case when the sensors and/or camera module openings are covered with a plate of glass. Obstruction of a distance sensor may interfere with proper focus control of one or more camera modules while obstruction of one or more camera modules may interfere with image capture.

Given that a preview image may be captured and displayed using a single camera module and distance sensor, a user may not be aware that they are blocking another distance sensor used to focus another camera module and/or another camera module which is not used to generate the preview image. Thus it is possible that after reviewing and finding a preview image acceptable a user may be disappointed by the results of the subsequent image capture given that one or more camera modules and/or focus sensors which were to be used during normal image captured were obstructed even though a camera module and/or sensor were able to be used for preview image capture and display purposes.

In view of the above, it should be appreciated that there is a need for methods and/or apparatus which can be used to detect and/or notify a user of an obstructed sensor, e.g., distance sensor, and/or camera module whether or not the camera module and/or sensor is used for preview image capture and/or generation purposes.

SUMMARY

Methods and apparatus for detecting and/or indicating a blocked sensor and/or blocked camera module are described. In some but not necessarily all embodiments the sensor is a distance sensor used to support focus operations. Depending on the embodiment, the camera system may include one or more sensors and one or more camera modules. The camera modules in some embodiments are implemented as optical chains, with each optical chain including an image sensor, e.g., optical sensor, and at least one lens. The focus control of different camera modules can be controlled by the same or different distance sensors.

In one embodiment a preview image is captured and displayed. Distance is sensed using at least one distance sensor which is used for focus control. In some but not all embodiments one or a few camera modules are used to capture the preview image while multiple camera modules are used to capture images during a normal, as opposed to preview, image capture time period. The multiple images may, and sometimes do, correspond to different focal length camera modules having different fields of view. The openings of different camera modules, e.g., optical openings, may be, and often are, located at different locations on the face of the camera device in which the camera modules are mounted. Similarly various distance sensors may be, and sometimes are, located at different positions on the face of the camera device.

As sensors' outputs are captured and/or images are captured by one or more camera modules, the sensor outputs, e.g., distance sensor outputs, and/or captured images, e.g., optical image sensor outputs, are checked to determine if one or more of the sensors and/or camera modules are obstructed. For example, if a finger or hand is covering a portion of a distance sensor, the output of the distance sensor may indicate a zero distance or distance below a minimum camera focus range indicating blockage of a focus distance sensor. If all or a portion of an image sensor of a camera module receives little or no light, particularly when other camera module image sensors capture light corresponding to a scene area, obstruction of the camera module opening may be detected. One or more distance sensors and/or camera modules may be identified as being obstructed.

Obstruction of a distance sensor or camera module may have a significant impact on one or more captured images, whether or not it affected the capture and display of a preview image.

Accordingly, in various embodiments when an obstruction of a sensor or camera module is detected, to make a user aware of the obstruction condition a visual and/or physical, e.g., haptic, indication of an obstructed, e.g., partially or fully blocked sensor and/or camera module is provided to the user of the camera device.

In some embodiments the physical indication of a blocked sensor and/or camera module is in the form of haptic feedback, where the haptic feedback may and sometimes does include a serious of vibrations. Given the potentially significant impact of an obstruction, in some embodiments the haptic feedback takes of form of strong vibrations. The vibrations, in some embodiments, used to indicate an obstruction, are generated at the strongest vibration setting or level used to indicate a camera condition. In this way the user is quickly made aware that a sensor or camera module is obstructed, e.g., by the way the user is holding the camera or for some other reason. The haptic feedback may and in some embodiments does include a sequence of vibrations, e.g., a set of 2 or 3 consecutive vibration periods. The number of vibrations may and sometimes does exceed the number used to indicate other camera conditions thereby indicating the significance of the condition and also increasing the likelihood that the user will take notice of the haptic feedback and take action, e.g., change his/her hand position, to eliminate the sensor or camera module obstruction.

While haptic feedback can quickly make a user aware of an obstructed sensor or camera module condition, it can also be useful to provide a visual indication of the obstruction condition. In some embodiments, in addition to haptic feedback used to notify a user of a blocked sensor or blocked camera module condition, a visual indication is provided in addition to the haptic feedback. In other embodiments a visual indication is provided without haptic feedback.

The visual indication of a blocked sensor or camera module can take a variety of forms. In some embodiments, the indication of a block sensor includes displaying an image representing the front of the camera with a visual indication of which sensor or camera module on the front of the camera is obstructed. The indication of obstruction may and sometimes does take the form of an image illustrating a hand or finger blocking the camera module or sensor which was detected as being obstructed.

In some embodiments the visual indication of an obstructed sensor or camera module is in the form of an image displayed on the display screen on the back of the camera. The image indicating the obstruction condition may be, and sometimes is, an inset image, e.g., an image shown in a picture-in-picture window on the camera display while the display shows a preview image. The location of the inset window in some embodiments corresponds to the location of the sensor or camera module which is obstructed. For example, if a sensor or camera module on the lower right hand side of the camera, as determined from the rear of the camera, is obstructed, the image showing an obstructed sensor or camera module is positioned on the lower right hand side of the display mounted on the rear of the camera. In one such embodiment if a sensor or camera module on the upper left hand side of the camera, as determined from the rear of the camera, is obstructed, the image showing an obstructed sensor or camera module is positioned on the upper left hand side of the display mounted on the rear of the camera. This allows the user to intuitively know whether the sensor or camera module that is obstructed is on the left or right side and whether the obstruction is on the upper or lower portion of the camera as might be the case when the user's finger of a hand holding the camera extends in front of the camera blocking one or more sensors.

In some embodiments a plurality of predetermined images showing blockage of a sensor or camera module are stored. Which image is selected for display is based on which sensor or camera module is obstructed. Thus, indicating an obstruction may involve displaying an inset picture or other image indicating which sensor(s) and/or camera module(s) have been detected as being obstructed and giving the use an indication of the location of the obstructed sensor(s) or camera module(s).

While the image indicating the obstruction condition may, and sometimes does, occupy the full display, in embodiments where an inset picture is used, the user can still view portions of the preview image allowing the user to continue to visually track and align the camera with the intended target of interest while still providing the user with a timely notification of the blocked sensor or blocked camera module.

After notifying, e.g., indicating to a user, a detected sensor or camera obstruction, a period of time is allowed to pass, and the camera device re-checks to determine if the obstruction has been removed. If the obstruction has been removed, operation proceeds normally, with multiple camera modules being used in parallel to capture images with the focus setting of one or more camera modules being adjusted at least in part based on the output of one or more distance sensors.

If the obstruction has not been removed and is detected after the initial notification, the user may again be notified of detected obstruction, e.g., with the obstruction condition being indicated in the same or similar manner the initial obstruction was indicated to the user.

Numerous variations benefits and embodiments are discussed further in the detailed description which follows.

BRIEF DESCRIPTION OF THE FIGURES

FIG. 4 illustrates the camera of FIGS. 1-3 with a visual indication of a sensor and camera module obstruction being presented to the user of the camera along with a portion of a preview image captured by an unobstructed camera module.

FIG. 5 illustrates the camera of FIGS. 1-3 with an alternative visual indication of a sensor and camera module obstruction being displayed on the display of the camera device to a user.

DETAILED DESCRIPTION

Figure 1:
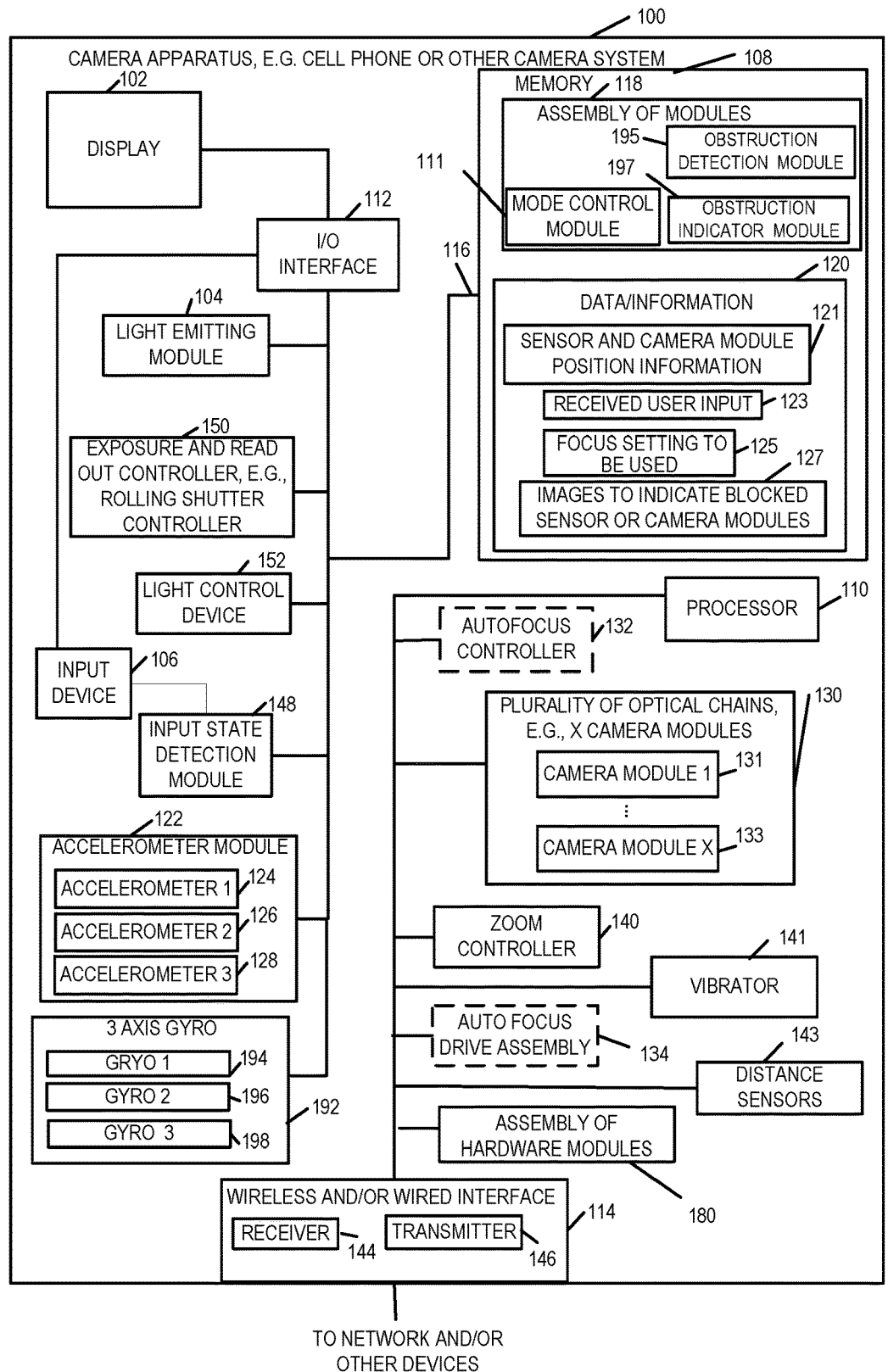
FIG. 1 is a block diagram of an exemplary apparatus, e.g., a camera device, implemented in accordance with an embodiment of the present invention.

FIG. 1 illustrates an exemplary camera apparatus 100 such as a digital camera, notepad with camera functionality, or cell phone with camera functionality, implemented in accordance with one exemplary embodiment of the present invention. The camera device 100, in some embodiments, is a portable device that can be held in a users hand.

FIG. 1 illustrates the camera device 100 in block diagram form showing the connections between various elements of the apparatus 100. The exemplary camera device 100 includes a display device 102, a vibrator 141 for providing haptic feedback, distance sensors 143 for supporting range finding and autofocus operations, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The processor 110 when executing machine executable instructions, e.g., instructions stored in memory 108 controls the camera apparatus 100 to implement a method in accordance with the invention, e.g., to perform one, all or multiple steps of the exemplary method shown in FIG. 6. The light emitter module 104 includes light emitting elements which may be LEDs (Light Emitting Diodes) or other types of light emitting devices which can be individually controlled so that all the light emitting elements need not be on at the same time. The input device 106 may be, and in some embodiments is, e.g., keypad, touch screen, or similar device that may be used for inputting information, data and/or instructions. Thus a user input is received via the input device in some embodiments. The user input in some embodiments indicated a user selection of a type of photograph to be taken (e.g., panoramic, normal, high dynamic range (in terms of light range), color, black and white). In some embodiment the received user input indicates a user selected focus setting to be used for taking one or more photographs. It should be appreciated that to support different focus settings different sets of lenses (corresponding to camera different modules) may be selected for use in image capture. The received user input is stored in memory 108 as the current user input 123, e.g., indicating a currently selected type of photograph and/or other user selected input parameter.

The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes gyro 1 194, gyro 2 196 and gyro 3 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in an un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 2:
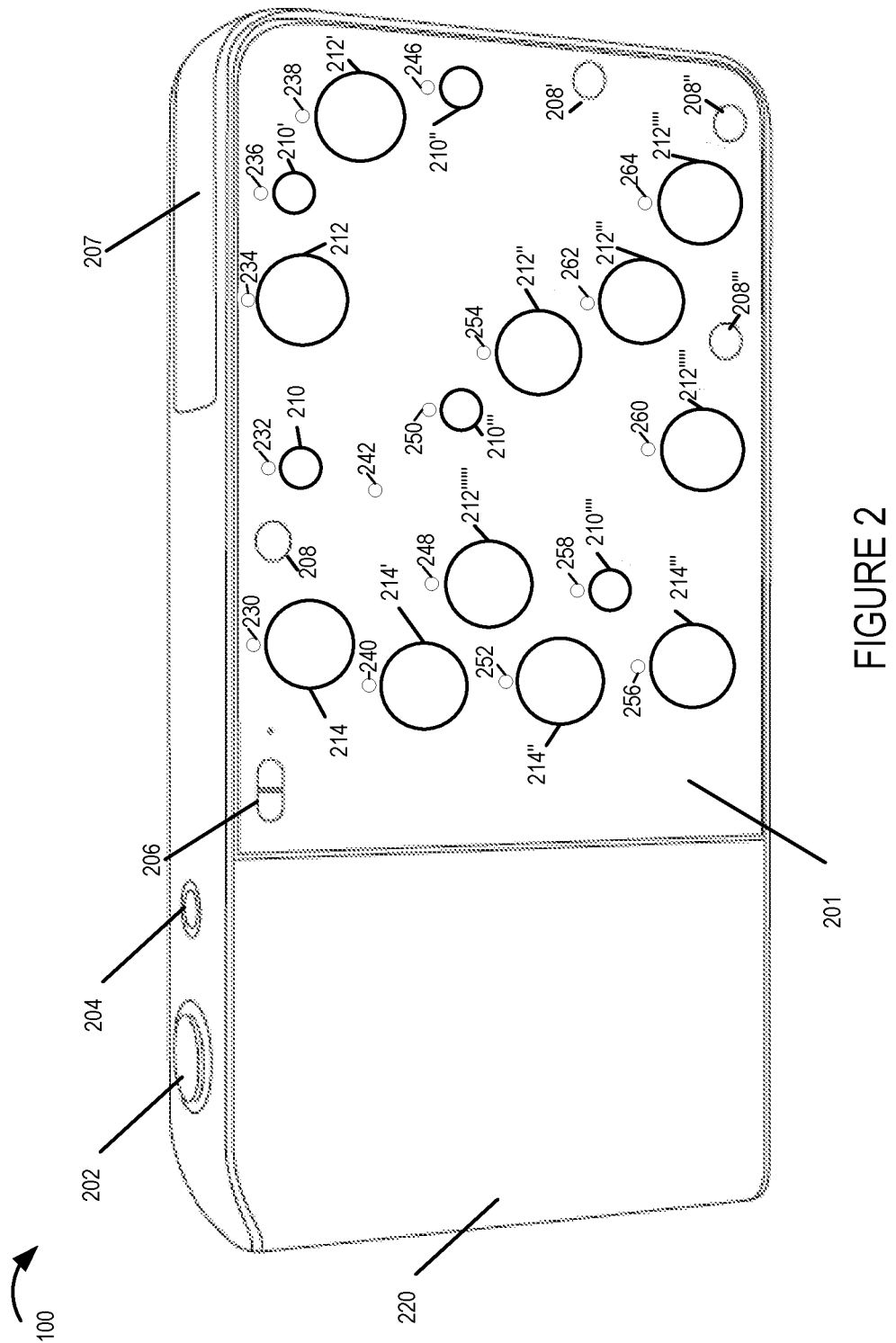
FIG. 2 is a perspective view of an exemplary camera device implemented using various camera modules and elements of the camera of FIG. 1, in accordance with a first embodiment.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 2 while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images. The data/information 120 also includes a plurality of images 127 which can be used to indicate that a sensor or camera module is blocked. The plurality of images 127 may include images corresponding to different camera modules and/or sensors located at different positions on the face of the camera. Which image is displayed and where the image or images are displayed, e.g., as inset pictures, on the display of the camera depends in some embodiments on which sensor(s) and/or module(s) are obstructed and where they are located on the face of the camera.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments. In some embodiments various camera modules are divided into different groups, e.g., sets of camera modules, with each set of the camera modules operating together as a group in image capture operation.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting devices, e.g., light emitting diodes (LEDs) and/or other types of light emitters, which can be illuminated in a controlled manner with the LEDs being controlled in groups or individually, e.g., in a synchronized manner based on operation of the rolling shutter and/or the exposure time, and/or or in order to indicate a dirty lens condition. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting devices, e.g., LEDs. In some embodiments the light emitting elements in the LED module 104 are arranged on a face of the camera with each individual light emitting device and/or a group of light emitting devices being able to be activated, e.g., illuminated, in accordance with the methods of the present invention. In some embodiments the light emitting elements in the LED module 104 include a plurality of sets of light emitting elements, each set of light emitting elements corresponding to a different image area which it illuminates and which is captured by a different portion of the image sensor. Lenses may be, and in some embodiments are, used to direct the light from different light emitting elements to different scene areas which will be captured by the camera through the use of one or more camera modules.

In accordance with one aspect of some embodiments various light emitting devices in the camera 100 can be activated individually to indicate a dirty lens condition and/or a point at which a subject of a photograph should look. In some such embodiments the light emitting devices arranged in the camera 100 in a way such that when a light emitting device is activated, e.g., powered to emit light, the light emitting device and/or the emitted light is visible from a face of the camera. In some embodiments one or more light emitting devices in the LED module 104 are on the face of said camera. In some embodiments light emitting devices are arranged, e.g., on the face of a camera, around outer lenses of the various camera modules in the camera such that when a given light emitting device is activated the light emitting device forms an illuminated ring around the lens of the corresponding camera module.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments. The light control device 152 (also referred to as the light controller 152) is configured to control light emitting devices in the camera, e.g., in a synchronized manner with the operation of the rolling shutter controller 150, individually or in groups in accordance with the features of the invention to support indication of dirty lens condition and/or a point where a subject of a photograph should look at during image capture. In some embodiments the light control device 152 is configured to activate different sets of light emitting devices to emit light based on a detected one or more dirty lenses and/or based on a selected set of camera modules being used for image capture at a given time. In some embodiments the light control device 152 is configured to activate a first light emitting device on a face of the camera 100 to emit light to indicate a dirty lens or a point at which a subject of a photograph should look. In some embodiments the light control device 152 is further configured to activate additional light emitting devices corresponding to additional lenses corresponding to camera modules in a set of camera modules at the same time the first light emitting device is activated, e.g., all light emitters corresponding to a group of camera modules so a user is able to determine which camera modules are being used to take a photo at the given time. In some embodiments the light control device 152 is further configured to deactivate one or more light emitting devices corresponding to lenses determined to no longer be dirty and keep light emitting devices corresponding to dirty lenses active and emitting light to signal that further cleaning is required.

In some embodiments the light control device 152 is further configured to activate at least one light emitting device on the face of the camera associated with a dirty lens to emit light to signal that the lens is dirty. In some embodiments activating at least one light emitting device on the face of the camera includes activating light emitting devices corresponding to multiple different dirty lenses to indicate which lenses are dirty while leaving light emitting devices corresponding to lenses which were not detected to be dirty unlit. In some embodiments the light control device 152 is further configured to deactivate the light emitting devices associated with lenses which were previously determined to be dirty but are no longer determined to be dirty.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor 110 may be a dedicated processor that is preconfigured to implement the methods. However, in many embodiments the processor 110 operates under direction of software modules and/or routines (e.g., in embodiments where one or more modules are implemented as software) stored in the memory 108 which include instructions that, when executed, cause the processor 110 to control the camera device 100 to implement one, more or all of the methods described herein. Memory 108 includes an assembly of modules 118 wherein one or more modules include one or more software routines, e.g., machine executable instructions, for implementing the methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention.

The assembly of modules 118 includes a mode control module 111 which determines, e.g., based on user input which of a plurality of camera device modes of operation are to be implemented. The assembly of modules 118 also includes an obstruction detection module 195 for examining distance sensor and/or camera module outputs and detecting when a distance sensor or camera module is obstructed, e.g., blocked. The assembly of modules 118 also include an obstruction indicator module 197 for controlling the generation of a visual and/or haptic indication of an obstruction of one or more sensors and/or camera modules, in accordance with the invention, in response to detecting that a sensor or camera module is determined to be obstructed, e.g., blocked.

In different modes of operation, different camera modules 131, 133 may and often are controlled differently based on the selected mode of operation. For example, depending on the mode of operation different camera modules may use different exposure times. In some embodiments, depending on user input and/or a selected focus setting, the mode control module 111 controls the camera to operate in different modes where different camera modules may be selected for image capture. In some such embodiments depending on a selected set of camera modules being active at a given time, one or more corresponding light emitting devices may be activated indicate a dirty lens or a point at which a subject of a photograph should look in accordance with the features of the present invention. In some embodiments, the operations performed by the processor 110 when executing the instructions from one or more assembly of modules is instead performed by a hardware module which performs the same functionality and is included in the hardware assembly of modules 180.

The data and information 120 stored in memory 108 includes e.g., captured images of a scene, combined images of a scene, sensor and/or camera module position information indicating the location of various modules and sensors on the front of the camera which can be used to facilitate selection of a corresponding blockage indicator image indicating an obstruction over one or more camera modules over one or more modules and/or sensors located on the front of the camera. Using position information 121 the obstruction indicator may and sometimes does determine where to place a picture in picture (PIP) window on display 102 to indicate obstruction of a camera module or sensor. The location of the PIP on the display located on the back of the camera may, and sometimes does, correspond to the location of the obstruction in front of the camera so that the user gets as sense that by looking at the display they are seeing through the camera body and observing the obstruction or at least the location of the obstruction on the front of the camera device.

The received user input 123 is a current user input, e.g., indicating a currently selected type of photograph and/or other user selected input parameter. When a new user input is received indicating information which is different from the stored user input 123, the processor 110 updates the stored user input 123 to reflect the change. The focus setting to be used 125 includes a focus setting value to be used for image capture operation at a given time and may be updated in a similar manner upon a user selected change and/or auto, e.g., camera selected, change in the focus setting.

The memory 108 includes different types of memory for example, Random Access Memory (RAM) in which the assembly of modules 118 and data/information 120 may be, and in some embodiments are, stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

FIG. 2 shows an exemplary handheld camera apparatus such as the apparatus shown in FIG. 1 as viewed front the front with the various camera modules and sensors visible. The exemplary camera devices shown in FIG. 2 includes a plurality of camera modules corresponding to different focal lengths, e.g., 35 mm focal length modules, 70 mm focal length modules, and 150 mm focal length modules, and various other components shown in the camera of FIG. 1. In some but not necessary all embodiments the camera focal length is expressed as a 35 mm film equivalent focal length. The 35 mm film equivalent focal length is a measure that indicates the angle of view of a particular combination of a camera lens and film or sensor size. The term is useful because most photographers experienced with interchangeable lenses are most familiar with the 35 mm film format.

The camera also includes one or more distance sensors which can be used as range finders for focus purposes and a flash unit. The distance sensors in some embodiments are array based sensors in some embodiments capable of measuring depths to multiple objects corresponding to the area which may be captured, e.g., by a camera module or camera modules. In some embodiments one or more of the distance sensors measure a single depth. The single depth sensors and array based depth sensors may be and sometimes are IR based devices. In some embodiments the depth sensor or sensors are used for focus control, e.g., of a corresponding camera module or modules. In addition to the elements shown in FIG. 2 and the other figures showing the components of the FIG. 2 camera embodiment the camera can, and in some does include a processor, memory and various other circuits and components such those shown in FIG. 1.

FIG. 2 is a perspective view of an exemplary camera apparatus 100 implemented using various modules and components shown in FIG. 1. Exemplary camera 100 is a handheld camera in the FIG. 2 embodiment with a plurality of camera modules 130 corresponding to 3 different focal lengths, one or more depth sensors, a range finder, a built in flash unit and a plurality of light emitting devices, e.g., LEDs. Camera 200 includes a shutter control 202, a power button 204, a flash 206, depth sensors (208, 208', 208'', 208'''), 35 mm camera module lens (210, 210', 210'', 210''', 210''''), a range finder distance sensor 211 with an array of sensors, 70 mm camera module lens (212, 212', 212'', 212''', 212'''', 212''''', 212''''''), 150 mm camera module lens (214, 214', 214'', 214'''), a plurality of depth sensors (230, 232, 234, 236, 238, 240, 242, 244, 246, 248, 250, 252, 254, 256, 258, 260, 262 and 264), e.g., one per camera module, and a battery compartment 220 with the outside portion and surface shaped to serve as a camera grip. While one depth sensor is shown per camera module fewer depth sensor may be used since one or more of the camera modules may have the same or overlapping fields of view.

The 70 mm camera modules and the 150 mm camera modules include movable mirrors in some embodiments. The 35 mm camera modules do not include mirrors. In some, but not necessarily all embodiments, no lenses are included before mirrors of 70 and 150 mm camera modules and the outer lenses in such embodiments are just a flat plate of glass or plastic. The position of the various sensors and camera module outer lenses can be appreciated from the face 201 of the camera 200. In some embodiments at least some of the sensors are positioned adjacent a corresponding camera module opening while some may be positioned at or near a center of a cluster of lenses of the camera modules.

In accordance with one aspect of some embodiments one or more of the distance sensors and/or camera modules on the face 201 of the camera can be obstructed, e.g., by fingers of a hand holding the camera. The user may not be aware of the obstruction caused by the way in which the user is holding the camera device.

However, in accordance with the invention the obstruction of one or more sensors and/or camera module openings can be detected and indicated to a user even when a preview image may be captured and displayed using an unobstructed camera module. The indication of the obstruction of a sensor or camera module may be, and sometimes is, in the form of haptic feedback, e.g., vibrations which are automatically initiated by the camera device to indicate the obstructed condition and/or visually, e.g., on the display device 102 of the camera 100.

Thus a user of the camera can be quickly informed of an obstructed sensor and/or camera module opening in time to take prompt corrective action, e.g., moving of the fingers blocking of the sensors and/or modules.

Figure 3:
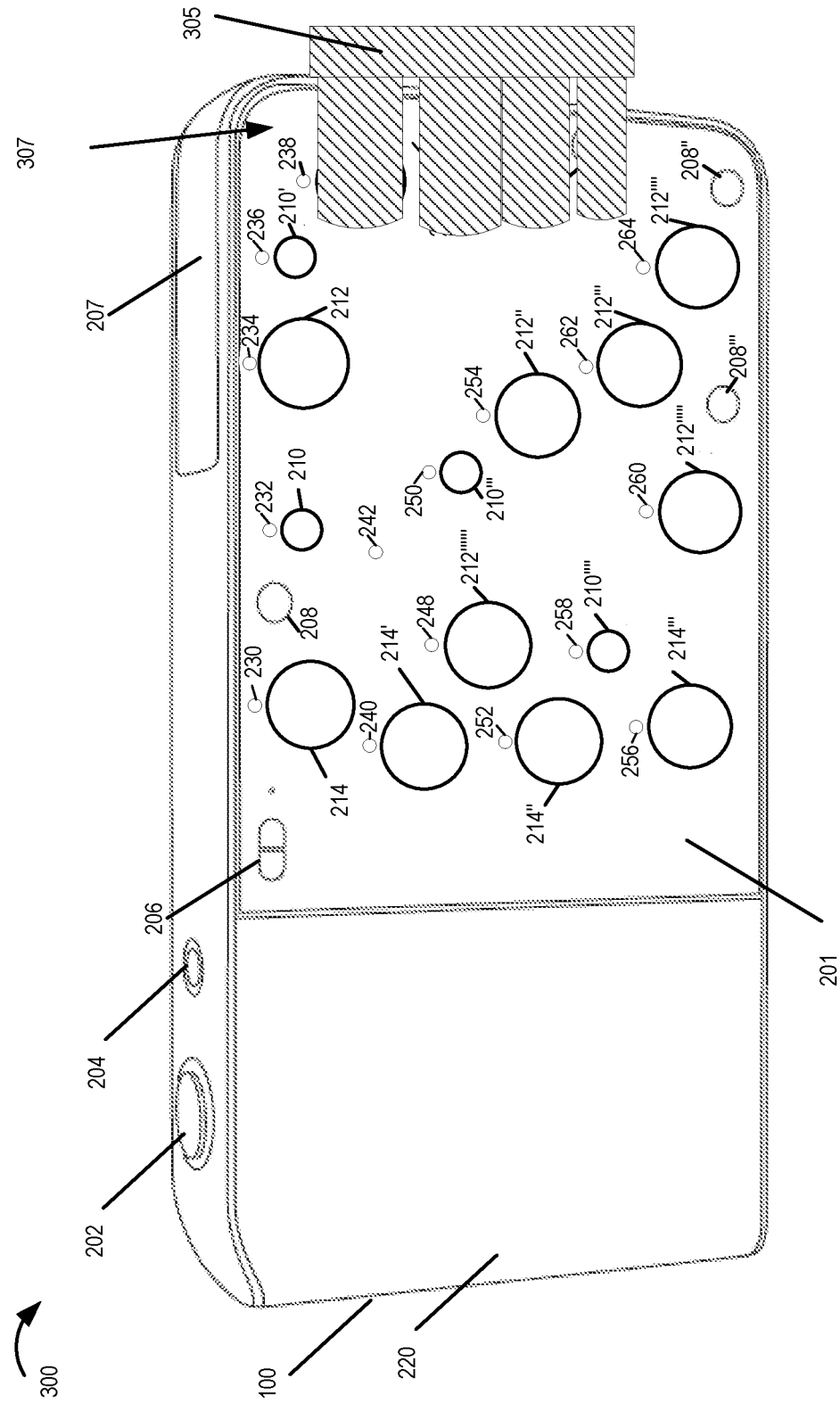
FIG. 3 illustrates a view of the exemplary camera device of FIG. 2 as held in a user's left hand between the user's four fingers which are visible on the front of the camera and the user's thumb positioned behind the camera.

FIG. 3 is a drawing 300 illustrating the camera device 100 being improperly held in a user's left hand 305 between the user's four fingers 307 on the front of the camera and thumb on the back of the camera. Note that the user's four fingers 307 block some of the sensors, e.g., sensor 246, and camera modules, e.g., camera modules 212', 210'' and 208' while other camera modules are left unobstructed. For example, as shown in FIG. 3, the sensor 246 is obstructed along with camera modules 212', 210'' and 208'. The user may be unaware of the obstruction and a preview image may be captured and displayed using an unobstructed distance sensor 248 used for focus of the unobstructed camera module 212'''''' which may be used as the source of the preview image.

FIG. 4 shows how, upon detection of the obstruction shown in FIG. 3, the obstruction is indicated to the user of the camera module on the display 102 which is also used to display a preview image 405.

FIG. 4 is an illustration 400 in which a preview image 405 is displayed with an inset picture 402 displayed on a portion of the display 102 on the rear of the camera corresponding to the area on the front of the camera which is obstructed. The inset image 402 is selected from a plurality of stored images used to indicate sensor and/or module obstructions based on which camera modules and/or sensors are obstructed. The location of the inset picture on the display 102 is selected in some embodiments based on the location of the obstructed sensors/camera modules. The inset picture may include an image of an exemplary obstruction such as hand 305 and a diagram of where the camera modules and/or sensors which are obstructed. This gives the user a sense of looking through the camera housing at the obstruction and provides an intuitive way for the user to know where the obstruction is located on the front of the camera. Note that by blocking out a portion of the preview image the user is also provided an easy to understand indication that some of the desired image may not be captured due to the obstruction unless corrective action is taken.

While in the FIG. 4 example an obstruction is shown as well as a representation of the blocked sensors and/or camera modules with the blocked sensor 246 and blocked modules 212', 210", 208' being indicated in the form of circles with cross hatching in other embodiments the image may simply show blocked sensors and/or blocked modules to make the user aware of detected obstructed sensors and/or module openings.

FIG. 5 is an illustration 500 which is similar to the illustration shown in FIG. 4 but which indicates to the user on the display 102 which sensor(s) and camera modules are detected by displaying inset image 502 within preview image 405 on the display 102 which is mounted on the rear of camera 100. Thus in the FIG. 5 example a user is provided a visual indication using a picture-in-picture display with the location of the inset picture being selected based on the location of the obstruction on the face of the camera. The image 502 used to notify the user of the obstruction of camera modules 212', 210", 208' and sensor 246 may be and sometimes is selected from a plurality of stored images used to indicate detected obtrusions. While a single inset picture is shown in FIGS. 4 and 5, if obstructions were present on different locations on the front of the camera, multiple inset pictures would be displayed. For example if in addition to the obstruction over module 212' is was determined that camera module 214''' was obstructed, another image would be displayed towards the lower right side portion of the display 102 to further indication obstruction of module 214'''.

Figure 6A:
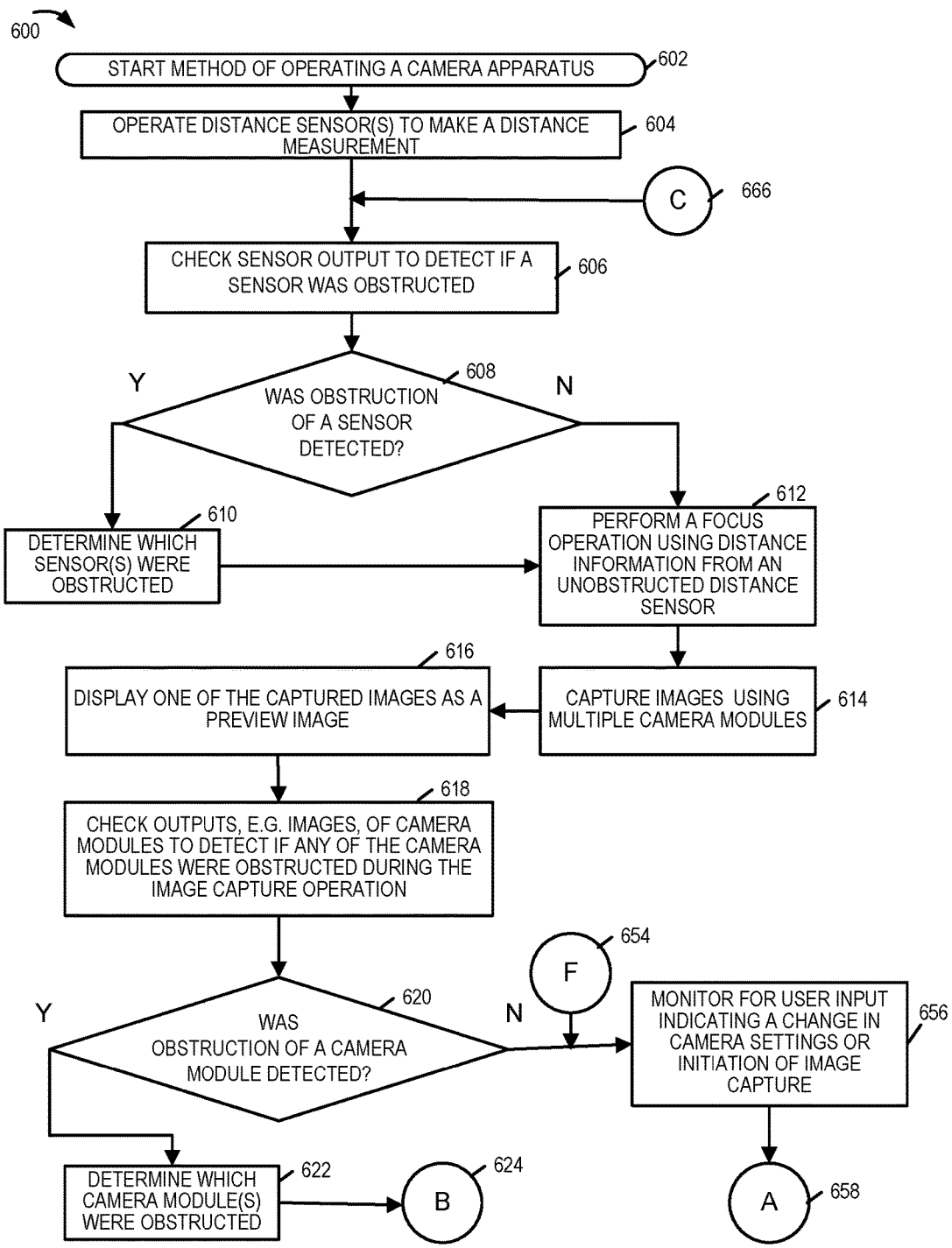
FIG. 6A is a first part of a flow chart showing the steps of a method implemented in accordance with the invention.
Figure 6B:
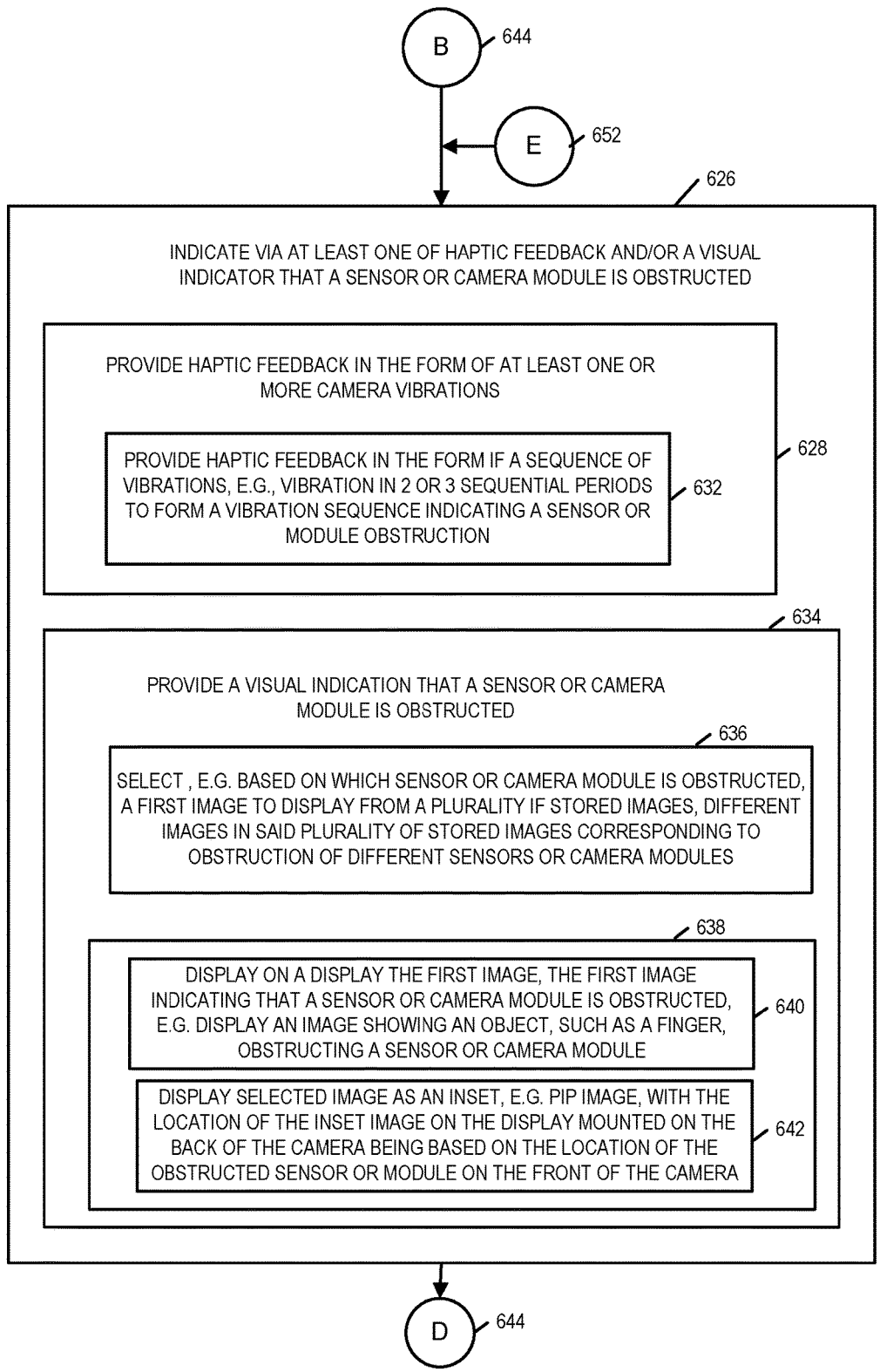
FIG. 6B is a second part of a flow chart showing the steps of a method implemented in accordance with the invention.
Figure 6C:
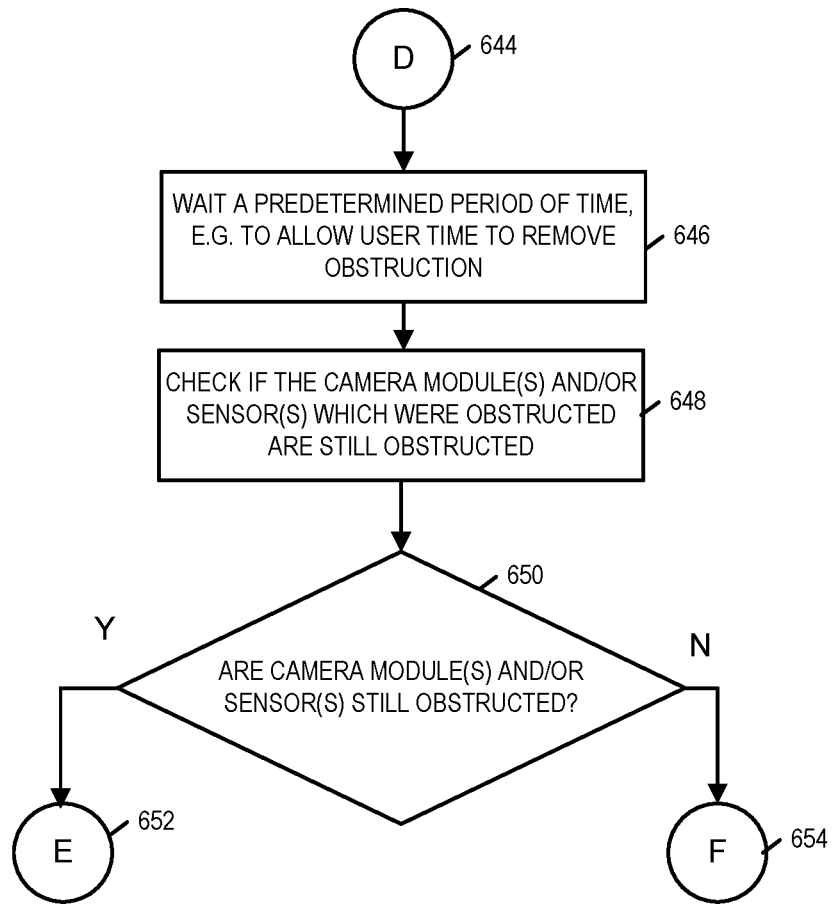
FIG. 6C is a third part of a flow chart showing the steps of a method implemented in accordance with the invention.
Figure 6D:
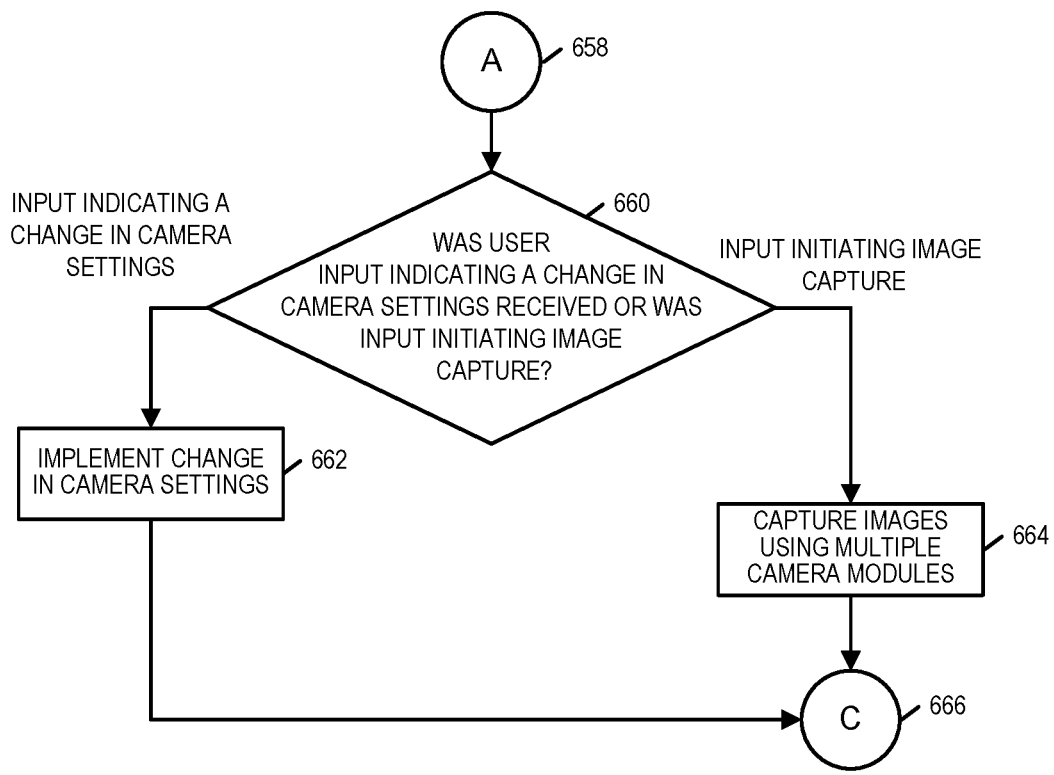
FIG. 6D is a fourth part of a flow chart showing the steps of a method implemented in accordance with the invention.
Figure 6:
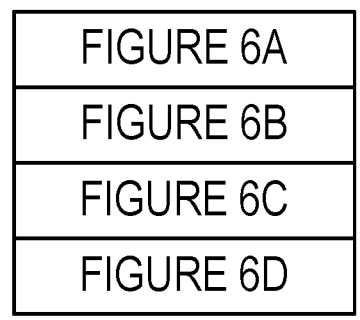
FIG. 6 is diagram which shows that FIG. 6 comprises the combination of FIGS. 6A, 6B, 6C and 6D.

FIG. 6, which comprises the combination of FIGS. 6A, 6B, 6C and 6D, shows the steps 600 of an exemplary method implemented in accordance with one exemplary embodiment of the invention. The method maybe and sometimes is implemented by a camera apparatus such as the one shown in FIG. 1. It may also be used with other camera apparatus such as a camera apparatus in a car where camera modules are located at different locations on a vehicle and a display maybe located on the dashboard and used to indicate the location of an obstructed sensor or camera module.

The method starts in start step 602, e.g., with the camera apparatus 100 being powered on and operation then proceeds to step 604 in which one or more distance sensors of the camera device are operated to make a distance measurement. Then in step 606 the output of the sensor or sensors which were used in step 604 to make distance measurements are checked to detect if one or more of the sensors were obstructed. Such a check may be made by comparing the output of the sensor to a minimum expected distance output and if the indicated distance or sensor output value is below the minimum expected than a determination is made that the sensor was obstructed, e.g., because an object such as a finger blocked the sensor.

Operation proceeds from step 606 where a determination is made whether obstruction of a sensor was detected. The answer to the inquiry in step 608 will be yes if any one of the sensor which made a distance measurement in step 604 was determined in step 606 to have been obstructed. Assuming an obstructed sensor was detected operation proceeds from step 608 to step 610 wherein a determination is made as to which sensor or sensor were obstructed. This information is used, in some embodiments as will be discussed further below, in determining what visual indication should be provided to a user of the detected obstruction(s) and in some embodiments where the indication should be displayed on the display device, e.g., the display located on the back of the camera in the embodiment where a camera of the type shown in FIGS. 1 and 2 is used.

Operation proceeds from step 610 to step 612. If in step 608 it was determined that no sensors used in step 604 were obstructed, operation will proceed directly from step 608 to step 612. In step 612 the camera apparatus 100, e.g., one or more camera modules in the apparatus, are controlled to perform a focus operation using distance information from an unobstructed distance sensor. Operation then proceeds to step 614 in which images are captured, e.g., in parallel, using multiple camera modules of the camera 100. Operation then proceeds to step 616 in which one of the captured images is displayed as a preview image, e.g., on the display 102 which in some embodiments is mounted on the back of the camera shown in FIG. 2. Operation proceeds from step 616 to step 618 in which the output, e.g., images, of camera modules are checked to detect if any of the camera modules were obstructed during the image capture operation. The check may involve checking if the light captured by a camera module is below a predetermined amount expected for an unobstructed image sensor or if the image captured by the camera module being checked has an average luminance similar to that of an image captured by another camera module which has the same or an overlapping field of view. Thus, in a variety of ways, based on the captured image it is possible to determine if a camera module opening, and thus the image sensor of a camera module, was obstructed.

Operation proceeds from step 616 to step 620 in which the camera apparatus determines if an obstruction of a camera module was detected, e.g., in step 618. If it is determined that any of the camera modules are obstructed operation proceeds from step 620 to step 622 wherein a determination is made as to which camera module or modules were obstructed. Operation proceeds from step 622 to step 626, shown in FIG. 6B, via connecting node 644. In step 626 the camera devices indicates via at least one of haptic feedback and/or a visual indicator that a sensor or camera module is obstructed. In step 628 which maybe performed as part of step 626, an haptic feedback, e.g., ore or more vibrations, is used to indicate a detected blocked sensor or camera module.

In some embodiments the haptic feedback includes step 632 and is in the form of a sequence of vibrations, e.g., two or three sequential vibration periods, which form a sequence indicating obstruction of a sensor or camera modules. In some embodiments the sequence of vibrations used to indicate a blocked sensor or camera module is the longest sequence of vibrations used to indicate a sensed condition relating to the camera. In some embodiments the vibrations used to indicate a block sensor are at the strongest level used to indicate a sensed camera condition. In this way by the intensity and duration of the haptic feedback a user of the camera apparatus 100 is quickly made aware of the blocked sensor and/or camera module and its significance.

In addition or as an alternative to haptic feedback, a visual indication may be provided to a user of the camera apparatus, e.g., on a display, that one or more sensor(s) and/or camera modules are obstructed. The visual indication that a sensor or camera module is obstructed is provided in step 634 which maybe performed as part of step 626. Step 634 includes in some embodiments step 636 in which a first image to display to a user to indicate the detection of a blocked sensor or camera is selected, e.g., from a plurality of stored blocked sensor and/or blocked camera module indicator images. The selection of the image is based in some embodiment on which sensor(s) and/or camera module(s) are obstructed and/or where the sensors and/or camera modules which are obstructed are located. Multiple images maybe selected for display when obstruction of sensors or camera modules located at different areas, e.g., sides of the camera face are detected.

Visual indication step 634 includes in some embodiments step 638 which involves displaying the image which was selected to indicate the blocked sensor and/or camera module condition. In step 640, which may be performed as part of step 638 the selected first image is displayed on the display 102 to indicate that a sensor or camera module is obstructed. The image maybe displayed as a picture in picture image while the preview is being displayed. In some embodiments the displayed image shows an object, e.g., finger obstructing a sensor or camera module. In other embodiments the blocked sensor is shown, e.g., with cross hatching, black or some other visual indicator indicating that the sensor or module is blocked.

In step 642 the selected image is displayed as an inset image, e.g., PIP image, with the location where the image is displayed being based on the location of the obstructed sensor or module on the front of the camera. For example, the user maybe given the impression that he/she is looking through the body of the camera and observing the obstruction.

With a visual and/or haptic indication of the obstructed sensor(s) and/or camera module(s) having been provided to a user of the camera apparatus in step 626 operation proceeds via connecting node D 644 to step 646 shown in FIG. 6C. In step 646 the camera apparatus is controlled to wait for a period of time before taking further action to allow a user an opportunity to clear the obstruction, e.g., move his or her hand or fingers so that they no longer obstruct a distance sensor or camera module. After waiting in step 646 for the predetermined period of time, e.g., one or a few seconds, operation proceeds to step 648. In step 648 a check of the camera modules and/or sensors which were obstructed is made to determine if they are still obstructed. In step 650 which action to take after step 648 is determined based on whether one or more camera modules were determined to still be obstructed. If some camera modules are still obstructed operation proceeds via connecting node E 652 back to step 626 where an indication of the detected blockage is again provided to the user.

If however in step 650 it is determined that none of the camera modules or sensor are obstructed, e.g., because the previously detected obstructions have been cleared, operation proceeds via connecting node F 654 to step 656 shown in FIG. 6A.

In step 656 the camera apparatus monitors for additional input from the user, e.g., depressing of a button used to trigger image capture or input which can be used to change a camera setting. In response to detecting such input operation proceeds from step 656 to step 660 (shown in FIG. 6D) via connecting node A 658.

In step 660 the type of user input which was received is determined. Note that by the time step 660 is reached it will have been determined that the sensor(s) and/or camera modules are not obstructed and the camera can be used for normal image capture.

If in step 660 it is determined that the received input was to implement a change in a camera setting operation proceeds to step 662 where the user indicated change in camera settings is made before operation proceeds via connecting node C 666 back to step 606. If however in step 660 it is determined that the user input is input initiating image capture operation proceeds to step 664 in which images are captured, e.g., using multiple camera modules of the camera apparatus 100 in parallel or in a synchronized manner. Operation proceeds from image capture step 664 back to step 606 via connecting node C 666.

It should be appreciated that the steps shown in FIG. 6 may be repeated on an ongoing basis as the camera apparatus checks for blocked sensors and/or camera modules before taking images with the user using the camera over a period of time to capture multiple sets of images in some cases.

While the assembly of modules includes, in some embodiments modules that are implemented in software, e.g., machine executable instructions, it should be appreciated that such modules can, and in some embodiments are, implemented in hardware, e.g., as an ASIC, or a field-programmable gate array (FPGA) or other circuit, in the assembly of hardware modules 180. Thus the assembly of hardware modules 180 includes hardware modules, e.g., circuits, corresponding to each of the modules discussed above. In still some other embodiments the modules are implemented as a combination of software and hardware.

Various numbered Exemplary embodiments will now be discussed.

Exemplary method 1 is a method of operating a camera system, the method comprising: checking camera sensors and camera modules for obstructions, detecting an obstruction of a sensor (e.g., distance sensor) or camera module; and indicating via at least one of haptic feedback or visual feedback that a sensor (e.g. distance sensor used for camera focus control) or camera module is obstructed. Detection of sensor blockage, e.g., obstruction, may include determining if a sensor readout is below a threshold level with the low level indicating blockage of the sensor or a portion of the sensor or module by an amount which is indicative of an obstruction. The level indicating blockage maybe based on an output of another sensor or on the output of camera module with a corresponding FOV to the camera module being checked for an obstruction. For example if the light level sensed from one camera module is 20% that sensed by another camera module with the samer or an overlapping FOV the low level of light sensed may indicate blockage blocage of the camera module. Similarly if output of a distance sensor indicates a 0 or minimal distance it may be interpreted as indicating blockage of the distance sensor indicating 0 or a distance below a minimum distance.

Method embodiment 2 is a method which includes method 1 and in which said indicating includes providing haptic feedback in the form of at least one camera vibration.

Method embodiment 3 includes method embodiment 2, wherein said indicating includes providing haptic feedback in the form of a sequence of camera vibrations, said sequence including at least 3 sequential vibration periods of vibration.

Method embodiment 4 includes method embodiment 3, wherein said indicating includes providing haptic feedback in the form a sequence of camera vibrations, said sequence being the longest sequence of vibrations used to indicate a predetermined condition which triggers a haptic response.

Method embodiment 5 includes method embodiment 4 wherein the strength of vibrations is a maximum strength used for haptic feedback to a user to indicate a camera condition.

Method embodiment 6 includes the step of method embodiment 2 and further includes waiting a predetermined period of time; and checking the camera module or sensor which was obstructed to determine if it is still obstructed; and if the camera module or sensor is still obstructed, repeating said step of indicating via at least one of haptic feedback or visual feedback that a distance sensor or camera module is obstructed.

Method embodiment 7 includes method embodiment 1 and includes as part of indicating via visual feedback that a sensor or camera module is obstructed, displaying on a display of the camera a first image showing a sensor or camera module being obstructed by an object.

Method embodiment 8 includes the features of method embodiment 7, and involves using as the first image an image showing a finger blocking at least a portion of a sensor or camera module.

Method embodiment 9 includes the features of method embodiment 7 and further includes selecting said first image from a plurality of stored images, different images in said plurality of stored images corresponding to obstruction of different sensors or camera modules.

Method embodiment 10 include the features of method embodiment 9, wherein selecting said first image from the plurality of stored images includes selecting said first image based on which of a plurality of sensors or camera modules is determined to be obstructed.

Method embodiment 11 include the features of method embodiment 10, wherein the selected first image shows an object, e.g., representing a finger, obstructing at least the sensor or camera module which was determined to be obstructed.

Method embodiment 12 includes the features of method embodiment 7, wherein said first image is displayed as an inset (PIP) image on the display while a preview image is being displayed.

Method embodiment 13, includes the features of method embodiment 12 wherein the display is on the rear of the camera and the first image is displayed on a portion of the display corresponding to the front portion of the camera where the obstructed sensor or camera module is located (e.g., if sensor or camera module which is obstructed is in the lower front right corner of the camera the corresponding lower rear corner of the camera is where the image showing blockage is placed so that the image window shown on the rear corresponds directly to the obstructed front portion of the camera if one were to look straight through from the rear to the front of the camera.

Method embodiment 14 includes the features of method embodiment 1 wherein indicating via at least one of haptic feedback or visual feedback that a sensor or camera module is obstructed includes providing both haptic feedback and visual feedback indication that the sensor or camera module is obstructed.

Exemplary apparatus embodiment 1 is directed to a camera system, the comprising: at least one sensor; a plurality of camera modules; and a processor configured to detect obstruction of a sensor or camera module; and control the camera system to indicate via at least one of haptic feedback or visual feedback that a sensor or camera module is obstructed.

Exemplary camera apparatus embodiment 2 is directed to apparatus embodiment 1, wherein the camera apparatus further includes a vibrator; and wherein said indicating includes providing haptic feedback by controlling the vibrator to vibrate at least once.

Exemplary camera apparatus embodiment 3 includes the features of camera apparatus embodiment 2, wherein said indicating includes controlling the vibrator to generate a sequence of camera vibrations, said sequence including at least 2 sequential vibration periods of vibration.

Exemplary camera apparatus embodiment 4 includes the features of exemplary apparatus embodiment 3, wherein the strength of vibrations is a maximum strength used for haptic feedback to a user to indicate a camera condition.

Exemplary camera apparatus embodiment 5 includes the features of embodiment 2 and further comprises a display; and wherein said processor is further configured to control said camera apparatus to display on the display a first image showing a sensor or camera module with an indication that the module is obstructed as part of indicating via visual feedback that a sensor or camera module is obstructed. In various other camera apparatus embodiments the processor of the camera device or system is configured to control the camera device or system to implement the steps of the method shown in FIG. 6.

Exemplary non-transitory computer readable medium embodiment 1 is directed to a non-transitory computer readable medium, e.g., memory or storage medium, including computer executable instructions which when executed by a processor control a camera apparatus to perform the steps of: detecting obstruction of a sensor or camera module; and indicating via at least one of haptic feedback or visual feedback that a sensor or camera module is obstructed.

Additional computer readable medium are directed to computer readable medium including processor executable instructions which when executed by a processor of a camera control the camera to perform one, multiple or all the steps of the method shown in FIG. 6 and/or the steps of any other method described in the present application.

Various additional features and embodiments will now be discussed since the various exemplary numbered embodiments have been discussed.

While in the FIG. 1 embodiment In other embodiments, the camera apparatus is shown as a handheld device in other embodiments the camera apparatus is not implemented as a handheld device but rather is integrated into a larger device such as car with the camera modules being mounted at different locations on the car body and with the display in the dashboard of the car. For example, the car camera apparatus may include a front camera module and distance sensor and a rear camera module and distance sensor. In accordance with the invention camera module and/or sensor module obstructions maybe and sometimes are detected and indicated to the user of the camera apparatus through a visual display, e.g., on the dashboard of the car. In one such embodiment a vibrator is included in the driver side car set and/or on the dash to provide haptic feedback. In the car mounted system, the camera housing would not have the shape of the handheld device shown in FIG. 1 but the car body would serve as the camera housing supporting the multiple camera modules, distance sensors and display. Thus in the case of a car or other large device, e.g., vehicle, the user of the system can be automatically made aware of obstructed camera modules and/or distance sensor which may affect system performance.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of operating a camera, the method comprising:
    detecting obstruction of a sensor or camera module;
    indicating via visual feedback that a sensor or camera module is obstructed, said indicating including displaying on a display of the camera a first image showing a sensor or camera module with an indication that the sensor or camera module is obstructed; and
    selecting, prior to displaying on the display of the camera the first imae, said first image from a plurality of stored images, different images in said plurality of stored images corresponding to obstruction of different sensors or camera modules.

2. The method of claim 1, wherein selecting said first image from the plurality of stored images includes selecting said first image based on which of a plurality of sensors or camera modules is determined to be obstructed.

3. The method of claim 2, wherein the selected first image shows an object obstructing at least the sensor or camera module which was determined to be obstructed.

4. The method of claim 1, wherein said sensor is a distance sensor.

5. The method of claim 1, further comprising:
    waiting a predetermined period of time;
    checking the camera module or sensor which was obstructed to determine if it is still obstructed; and
    if the camera module or sensor is still obstructed, repeating said step of indicating via visual feedback that a sensor or camera module is obstructed.

6. The method of claim 1, wherein said first image is an image showing a finger blocking at least a portion of a sensor or camera module.

7. A method of operating a camera, the method comprising:
    detecting obstruction of a sensor or camera module;
    indicating via visual feedback that a sensor or camera module is obstructed, said indicating including displaying on a display of the camera a first image showing a sensor or camera module with an indication that the sensor or camera module is obstructed; and
    wherein said first image is displayed as an inset (PIP) image on the display while a preview image is being displayed.

8. The method of claim 7, wherein the display is on the rear of the camera and the first image is displayed on a portion of the display corresponding to the front portion of the camera where the obstructed sensor or camera module is located.

9. The method of claim 7, wherein said sensor is a distance sensor.

10. The method of claim 7, further comprising:
    waiting a predetermined period of time;
    checking the camera module or sensor which was obstructed to determine if it is still obstructed; and
    if the camera module or sensor is still obstructed, repeating said step of indicating via visual feedback that a sensor or camera module is obstructed.

11. The method of claim 7, wherein said first image is an image showing a finger blocking at least a portion of a sensor or camera module.

12. A camera comprising:
at least one sensor;
a plurality of camera modules;
a display; and
a processor configured to:
    detect obstruction of a sensor or camera module;
    indicate via visual feedback that a sensor or camera module is obstructed, wherein being configured to indicate includes being configured to display on the display of the camera a first image showing a sensor or camera module with an indication that the sensor or camera module is obstructed; and
    select, prior to display on the display of the camera the first image, said first image from a plurality of stored images, different images in said plurality of stored images corresponding to obstruction of different sensors or camera modules.

13. The camera of claim 12, wherein said sensor is a distance sensor.

14. The camera of claim 12, wherein said processor is further configured to:
wait a predetermined period of time;
check the camera module or sensor which was obstructed to determine if it is still obstructed; and
if the camera module or sensor is still obstructed, repeat said indicating via visual feedback that a sensor or camera module is obstructed.

15. The camera of claim 12, wherein said first image is an image showing a finger blocking at least a portion of a sensor or camera module.

16. A non-transitory computer readable medium including computer executable instructions which when executed by a processor control a camera apparatus to perform the steps of:
detecting obstruction of a sensor or camera module;
indicating via visual feedback that a sensor or camera module is obstructed, said indicating including displaying on a display of the camera apparatus a first image showing a sensor or camera module with an indication that the sensor or camera module is obstructed; and
selecting, prior to displaying on the display of the camera apparatus the first image, said first image from a plurality of stored images, different images in said plurality of stored images corresponding to obstruction of different sensors or camera modules.

17. A camera comprising:
at least one sensor;
a plurality of camera modules;
a display; and
a processor configured to:
    detect obstruction of a sensor or camera module; and
    indicate via visual feedback that a sensor or camera module is obstructed, wherein being configured to indicate includes being configured to display on the display of the camera a first image showing a sensor or camera module with an indication that the sensor or camera module is obstructed; and
wherein said processor is configured to display said first image as an inset (PIP) image on the display while a preview image is being displayed.

18. The camera of claim 17, wherein said sensor is a distance sensor.

* * * * *